United States Patent [19]

Klein et al.

[11] Patent Number: 4,698,401

[45] Date of Patent: Oct. 6, 1987

[54] POLYFUNCTIONAL PHENOLIC REACTION PRODUCT, A PROCESS FOR ITS PREPARATION AND IT USE.

[75] Inventors: Dieter H. Klein, Rheinmünster, Fed. Rep. of Germany; Raymond Koenig, Vendenheim, France

[73] Assignee: The Dow Chemical Company, Midland, Mich.

[21] Appl. No.: 777,980

[22] PCT Filed: Jan. 30, 1985

[86] PCT No.: PCT/EP85/00027

§ 371 Date: Sep. 9, 1985

§ 102(e) Date: Sep. 9, 1985

[87] PCT Pub. No.: WO85/03513

PCT Pub. Date: Aug. 15, 1985

[30] Foreign Application Priority Data

Jan. 31, 1984 [DE] Fed. Rep. of Germany ....... 3403171

[51] Int. Cl.$^4$ ..................... C08G 14/06; C08G 59/14; C08L 61/00
[52] U.S. Cl. .................................. 525/489; 525/504; 525/509; 525/510; 525/523; 525/524; 528/118; 528/142; 528/143; 528/144; 528/149; 528/150; 528/151; 528/153; 528/154; 528/163
[58] Field of Search ............... 528/142, 118, 143, 144, 528/149, 150, 151, 153, 154, 163; 525/509, 504, 489

[56] References Cited

U.S. PATENT DOCUMENTS

| | | |
|---|---|---|
| 3,293,212 | 12/1966 | Power et al. ......................... 528/211 |
| 3,449,228 | 6/1969 | Yurcheshen et al. ............ 525/443 X |
| 3,773,721 | 11/1923 | Tiedeman ........................ 528/163 X |
| 3,812,202 | 5/1974 | Wright ................................ 525/118 |
| 3,896,081 | 7/1975 | Baxter et al. .................... 525/504 X |
| 4,217,377 | 8/1980 | Shay et al. ....................... 525/494 X |
| 4,338,263 | 7/1982 | Elmer .............................. 525/132 X |
| 4,393,181 | 7/1983 | Allen ................................... 525/504 |

FOREIGN PATENT DOCUMENTS 0097979 1/1984 European Pat. Off. .
622675 6/1949 United Kingdom .

Primary Examiner—Howard E. Schain

[57] ABSTRACT

A polyfunctional reaction product having functional phenolic OH groups is made available by reacting a phenol and an alkoxylated amino-aldehyde condensation product in the presence of a solvent and of an acid catalyst. This method makes it possible to prepare a polyfunctional phenolic reaction product which is soluble in organic solvents at a low ratio of phenolic OH groups to alkoxy groups without gelling. The reaction product is particularly useful as a curing agent for epoxy resins.

17 Claims, No Drawings

POLYFUNCTIONAL PHENOLIC REACTION PRODUCT, A PROCESS FOR ITS PREPARATION AND IT USE

The invention relates to polyfunctional phenolic reaction products which are obtainable by reacting a phenol and an alkylated amine-aldehyde condensation product and which are soluble in organic solvents, to a process for preparing these reaction products, and to the use of these reaction products.

The reaction product from reacting a polyhydric alcohol or polyhydric phenol with an amine-aldehyde condensation product which preferably contains functional methylol groups is known. Thus, for example, U.S. Pat. No. 3,293,212 shows a heat-curable reaction product of a bisphenol and of a polyalkyl ether of a polymethylolmelamine which has been prepared by reacting 0.5 to 2 moles of bisphenol per mole of the polyalkyl ether of a polymethylolmelamine in the presence of an acid catalyst and of a solvent. The indicated molecular ratio of bisphenol and alkylated polymethylolmelamine corresponds to an equivalent ratio of phenolic hydroxyl groups to alkoxy groups of 4:6 to 2:12, so that, if the maximum amount of phenol is used, the reaction product formed contains at least two functional methylol ether groups. During the reaction it is necessary to monitor the degree of conversion, so that the reaction can be discontinued before the gelling, so as to prevent the formation of a non-utilisable product.

U.S. Pat. No. 3,449,228 describes similar heat-curable reaction products which are prepared by reacting a polyhydric alcohol or a polyhydric phenol such as bisphenol A, and an amine-aldehyde condensation product, such as a melamine-aldehyde condensation product. These reaction products can be used for electropainting either alone or in combination with other materials. Although it is stated in said patent specification that the ratio of the amine-aldehyde condensation product and of the polyhydric alcohol or phenol can vary within wide limits, the products which are specifically described contain as functional groups primarily methylol ether groups which make the resin curable by heating. In the case of this resin it is also necessary to monitor the reaction in order to devoid undesirable gelling.

U.S. Pat. No. 4,217,377 describes a low-molecular solid addition product which is used as a crosslinking agent for various polymeric pulverulent coating compositions. The curing agent contains the reaction product of a monohydroxyl-mononuclear aromatic compound and of a hexakis-(alkoxymethyl)-aminotriazine. In the preparation of this compound, the aromatic monohydroxyl compound and the hexakisalkyl ether are used in such an amount that two of the six theoretically possible methoxymethyl ether groups of the triazine remain in the reaction product. These methoxy groups confer on the reaction product the required functionality for the crosslinking.

Another crosslinking agent for epoxy resins having reactive phenolic OH groups, as opposed to functional methylol ether groups, is described in U.S. Pat. No. 4,393,181. This crosslinking agent is obtained by reacting a polyhydric phenol with a hexakisalkyl ether of hexamethylolmelamine in such amounts that the ratio of phenolic OH groups to alkoxy groups is at least 2:1, preferably 3:1. The reaction is carried out in the absence of a solvent and preferably in the presence of an alkaline catalyst until the development of methanol is complete, i.e. until all alkoxy groups have reacted. The resulting polyfunctional phenolic addition product is a solid friable material which is particularly suitable for use as a crosslinking agent for pulverulent epoxy resins.

However, it is a disadvantage that the curing agents described and the indicated ratio of phenolic hydroxyl groups to alkoxy groups leads to cured epoxy resins of relatively low glass transition temperature. However, on preparing, using the known methods, a curing agent having a lower ratio of phenolic OH groups to alkoxy groups of the amine-aldehyde condensation products, these reaction products are generally insoluble in customary organic solvents and are of only very limited use.

It is therefore the object of the invention to provide a polyfunctional phenolic reaction product of an alkylated amine-aldehyde condensation product and of a polyhydric phenol which, given a low ratio of phenolic hydroxyl groups to alkoxy groups, is soluble in organic solvents and is to be suitable for use as a curing agent for epoxy resins.

This object is achieved by the invention defined in the claims.

In one embodiment, the invention is directed towards a polyfunctional phenolic reaction product of an alkylated amine-aldehyde condensation product with a polyhydric phenol and, if desired, a monohydric phenol, the essential point of the invention being that the phenol compound(s) has been used in a sufficient amount so as to produce a ratio of phenolic OH groups to alkoxy groups of 1:1 to less than 2:1 and this reaction product is soluble in organic solvents.

Another embodiment of the invention relates to a process for preparing a polyfunctional phenolic reaction product by reacting an alkylated amine-aldehyde condensation product with a polyhydric phenol and, if desired, a monohydric phenol by carrying out the reaction in the presence of an acid catalyst and of an organic liquid diluent and the amount of the phenol compound(s) is sufficient to provide at least one reactive phenolic hydroxyl group for every alkoxy group of the condensation product.

A third embodiment of the invention relates to the use of the polyfunctional phenolic reaction products of the invention as curing agents for epoxy resins. It is surprising that, on curing epoxy resins by means of the reaction products of the invention at the indicated low ratios of phenolic hydroxyl groups to alkoxy groups, the result is cured resins having high glass transition temperatures. For instance, a typical liquid epoxy resin, such as a diglycidyl ether of bisphenol A, on curing with a polyfunctional phenolic reaction product of the invention has a glass transition temperature of 145° to 160° C. If, for comparison, the same epoxy resin is cured with a curing agent as described in U.S. Pat. No. 4,393,181 (prepared with a ratio of phenolic hydroxyl groups to alkoxy groups of 3 : 1), the result is a product which has a glass transition temperature of only 110° to 135° C.

In the process according to the invention, an alkylated amine-aldehyde condensation product is reacted with a polyhydric phenol and, if desired, a monohydric phenol in the presence of an acid catalyst and of an organic liquid diluent. It is surprising that the indicated low ratios of phenolic hydroxyl groups to alkoxy groups give rise to reaction products which are soluble in the most common organic solvents. Examples of this type of solvent are customary solvents for varnish, such as ketones, for example acetone, methyl ethyl ketone or methyl isopropyl ketone, aromatic hydrocarbons, such as toluene or xylene, glycol ethers, such as ethylene glycol monomethyl ether or propylene glycol monomethyl ether, or their esters, such as ethylene glycol monomethyl ether acetate. The reaction products-according to the invention are generally fully miscible with these solvents, but have at least a solubility in one of these organic varnish solvents of 15 g/liter, preferably 30 g/liter.

If, for comparison, a polyhydric phenol is reacted with an alkyl ether of hexamethylolmelamine by the method of U.S. Pat. No. 4,393,181 at the low ratio of phenol groups to alkoxy groups of this invention, the result is a gelled material which is not soluble in the customary organic solvents.

The polyfunctional phenolic reaction products according to the invention can be used for curing epoxy compounds in numerous fields, such as, for example, for coating compositions and impregnating agents, for the production of adhesives for metals, wood or cement, for the production of reinforced composite materials, such as laminated products, thread-wound dressings, electric laminates for the production of powders for injection-moulding, such as for encapsulating electronic components, for example semiconductors and integrated circuits, fluidised-bed powders and embedding compositions. Owing to their solubility in most of the customary organic solvents, the products according to the invention are particularly suitable for use in varnish compositions for the production of electric laminates.

To prepare the polyfunctional phenolic reaction products of the invention, use is preferably made of polyhydric phenols of 2 to 6 hydroxyl groups and 6 to 30 carbon atoms. Particularly suitable polyhydric phenols are of the following structural formula

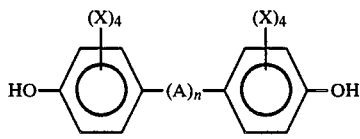

in which A is oxygen, sulphur, —S—S—, —CO—, —SO₂—, a divalent hydrocarbon radical of 1 to 10 carbon atoms or an oxygen-, sulphur- or nitrogen-containing hydrocarbon radical or a covalent bond; each X is independently hydrogen, halogen or a hydrocarbon of 1 to 10 carbon atoms, preferably 1 to 4 carbon atoms, and n has a value of 0 or 1. Particularly preferably A is a divalent hydrocarbon radical of 1 to 8 carbon atoms and each X is hydrogen. It is also possible to use mixtures of 2 or more of this type of polyhydric phenol with advantage.

It is also possible in the invention to use mixtures of one or more polyhydric phenols with one or more monohydric phenols, such as p-tertiary-butylphenol or nonylphenol. In the case a mixture of a polyhydric and a monohydric phenol is to be used, this mixture should as a rule contain less of the monohydric phenol. The monohydric phenol content is preferably below 25% by weight, and in particular below 15% by weight, based on the total weight of the polyhydric and monohydric phenol.

In the invention, chief preference goes to the dihydric phenols, in particular to 2,2-bis(4-hydroxyphenyl)propane, which is customarily referred to as bisphenol A (BPA).

The alkylated amine-aldehyde condensation products are amino resins and are prepared from amines, including amides, aldehydes and alcohols. Typical amines or amides are melamine, urea, benzoguanamine and dihydroxyethyleneurea, these compounds containing at least one reactive amino group. Amino resins and their starting materials and their preparation are described in detail in the literature, so that there is no need to cite specific publications. For the purposes of the present invention, alkylated amine-aldehyde condensation products are particularly preferably those which are soluble in organic solvents, but it is also possible to use those which are soluble in water and/or an organic solvent.

Of the amines, the triazines are preferred, melamine being particularly preferred. The aldehyde used is generally formaldehyde in the form of its aqueous or alcoholic solution or as paraformaldehyde. However, it is also possible to use other formaldehydes, such as, for example, acetaldehyde or furfural.

To prepare the alkylated amine-aldehyde condensation products, the initially obtained methylol or other alkylol compounds are etherified with an alcohol. Preferably, substantially all methylol or other alkylol groups are alkylated in the etherification reaction. The etherification can be carried out with monohydric aliphatic alcohols, such as methanol, propanol or butanol, and halogenated monohydric aliphatic alcohols, such as 3-chloropropanol. It is also possible to use aromatic alcohols, such as benzyl alcohol, and cycloaliphatic alcohols, such as cyclohexanol. Preferred etherification alcohols are monohydric saturated aliphatic $C_1$–$C_4$-aliphatic alcohols.

Preferred alkylated amine-aldehyde condensation products are hexaalkyl ethers of hexamethylolmelamine, which is also referred to as 2,4,6-triamino-1,3,5-triazine. These hexaalkyl ethers are of the formula

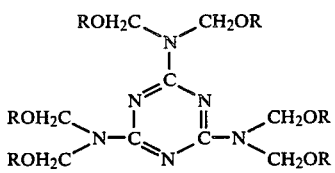

in which each R is independently an alkyl radical of 1 to 4 carbon atoms. Examples of such hexaalkyl ethers of hexamethylolmelamine are hexamethoxymethylmelamine, hexaethoxymethylmelamine, hexapropoxymethylmelamine, hexaisopropoxymethylmelamine, hexa-1-butoxymethylmelamine and hexaisobutoxymethylmelamine. It is also possible to use two or more different hexaalkyl ethers of hexamethylolmelamine. Hexamethoxymethylmelamine is most preferred.

In the preparation of the polyfunctional phenolic reaction products of the invention, the polyhydric phenol and the alkylated amine-aldehyde condensation product are used in such an amount that at least 1 and preferably less than 2.8 phenolic hydroxyl groups are present for each alkoxy group in the reaction mixture. The properties of the polyfunctional phenolic reaction product depend on the mixing ratio of the phenol and the alkylated amine-aldehyde condensate. Thus, for example, a reaction product within the lower part of the ratio of phenolic hydroxyl group to alkoxy groups gives rise to a cured epoxy resin having a higher glass transition temperature. Within the range of the invention for the ratio of phanolic hydroxyl groups to alkoxy groups the most advantageous ratio in an individual case depends on the desired properties of the polyfunctional phenolic reaction product and its ultimate use. Preferably the ratio of phenolic hydroxyl groups to alkoxy groups is 1.2:1 to 1.95:1, particularly preferably 1.4:1 to 1.9:1.

The acid catalysts used in the preparation of the polyfunctional phenolic reaction product can be known acid catalysts, such as Lewis acids, including all protonic (Bonsted) acids, which are capable of catalysing the reaction between the phenol and the alkylated amine-aldehyde reaction products. Typical acids of this type are alkylsulphonic or arylsulphonic acids or phosphonic acids, such as para-toluenesulphonic acid; monocarboxylic or polycarboxylic acids, such as oxalic acid and acetic acid; mineral acids, such as sulphuric acid, hydrochloric acid and nitric acid or mixtures of this type of acid. Preferred acid catalysts are dicarboxylic acids, in particular oxalic acid and arylsulphonic acids, such as para-toluenesulphonic acid.

The acid catalyst is used in a sufficient amount so as to catalyse the reaction between the phenol and the alkylated amine-aldehyde condensation product. In the individual case the amounts depend on a large number of factors, such as the specific compounds for the acid catalyst, the phenol and the alkylated amine-aldehyde condensate and the specific reaction conditions. The acid catalyst is generally used in amounts of 0.01 to 2, preferably 0.05 to 0.5, % by weight, based on the total weight of the phenol and the alkylated amine-aldehyde condensate.

The organic liquid used as a diluent in the reaction is preferably a solvent for the phenol, the alkylated amine-aldehyde condensate and their reaction product. Preferably the organic diluent is inert under the reaction conditions and boils at a temperature above the monohydric alcohol which is set free during the reaction of the phenol with the alkylated amine-aldehyde condensate. Examples of suitable organic diluents are low glycol ethers, such as ethylene glycol monomethyl ether, propylene glycol monomethyl ether or their esters, such as ethylene glycol monomethyl ether acetate; ketones, such as methyl isobutyl ketone, methyl ethyl ketone or methyl isopropyl ketone; aromatic hydrocarbons, such as toluene or xylene, and mixtures of this type of diluent. Preferred organic liquid diluents are esters, in particular ethylene glycol monoethyl ether acetate, and ketones, in particular methyl isobutyl ketone.

The organic liquid diluent is preferably used in an amount of at least 5% by weight, preferably 5 to 80% by weight, based on the total weight of the reaction mixture, including volatile and non-volatile matters. Particularly preferably the reaction mixture contains 10 to 60% by weight of the liquid diluent and 90 to 40% by weight of non-volatile matters.

The reaction between the phenol compound(s) and the amine-aldehyde condensate(s) is advantageously carried out at a temperature between 80° C. and 250° C., preferably between 100° C. and 220° C., very particularly preferably at 130° C. to 180° C. Although it is advantageous to carry out the reaction at such a temperature that the monohydric alcohol evaporates out of the reaction mixture, it is also possible to carry out the reaction under pressure without removing the liberated alcohol from the reaction vessel.

The reaction between the phenol and the alkylated amine-aldehyde condensate is continued until the development of the monohydric alcohol which is formed from the alkoxy group has become negligibly small. Substantially complete reaction of the phenol and the alkylated amine-aldehyde condensation product is desirable. The reaction should advantageously be carried out to a conversion of at least 60, preferably at least 80 and particularly preferably at least 90%, these percentages indicating what percentage of the alkoxy groups have reacted with the phenol, as measured by the amount of liberated alcohol. It is surprising that under the reaction conditions of the invention the reaction products remain in solution in the organic liquid diluent and the previously indicated high conversions at the low ratios of phenolic hydroxyl groups to alkoxy groups which are specified by the invention.

After the reaction has ended, the reaction product can be isolated out of the solution as a solid product by customary methods, such as evaporation of the organic liquid diluent. The isolated solid product can then be dissolved in the same or a different organic liquid. Alternatively, the polyfunctional phenolic reaction product can remain in the solution in which it has been prepared and can be processed further in this solution. If, for example, the polyfunctional phenolic reaction product is to be used as a varnish for preparing electric laminates, the reaction solution can be diluted further with the same or a different organic solvent and a suitable epoxy resin and if desired an accelerant can be added to obtain a suitable varnish composition.

The polyfunctional phenolic reaction product according to the invention is suitable for curing a plurality of epoxy resins, epoxy resins being understood as meaning compounds containing more than one 1,2-epoxy group. The epoxy resins can be saturated or unsaturated aliphatic, cycloaliphatic, aromatic or heterocyclic compounds and can contain one or more non-interfering substituents, such as halogen atoms, hydroxyl groups or ether radicals. The epoxy resins can be monomeric or polymeric compounds.

Epoxy compounds are well known in the art, so that it is sufficient to mention some literature references: "The Handbook of Epoxy Resins", H. Lee and K. Neville (1967) McGraw-Hill, New York, App. 4-1, pages 4-35 to 4-56 and U.S. Pat. Nos. 2,633,458, 3,477,990 (in particular column 2, line 39 to column 4, line 75), 3,821,243, 3,907,719, 3,975,397 and 4,071,477.

The polyfunctional phenolic reaction product of the invention is used in sufficient amounts to cure the epoxy resins. It is generally advantageous to use an almost stoichiometric amount, although it is possible to use an up to 100% excess either of the epoxy resin or of the polyfunctional phenolic reaction product.

In some uses, such as powder coating or the preparation of electric laminates, it is advantageous to add a curing accelerant to the mixture of the epoxy resin and the polyfunctional phenolic reaction product. It is possible to use known curing accelerants, such as amines, amides, polyamino-amides, imidazoles and benzimidazoles and their salts and addition products. Tin(II) salts of monocarboxylic acids having at least two carbon atoms, such as, for example, tin(II) octoate and tin(II) laurate, and alkaline earth metal hydroxides and alkali metal hydroxides, for example sodium hydroxide or calcium hydroxide, are also suitable.

The amount of accelerant used can vary, depending on a large number of factors, such as the specific nature of the epoxy compound and of the polyfunctional phenolic reaction product, the desired curing time and the ultimate use. In general the accelerant is used in an amount of 0.01 to 10, preferably 0.05 to 5, % by weight, based on the total weight of the polyepoxide.

The composition of the epoxy resin and the polyfunctional phenolic reaction product can also contain customary additives, such as plasticisers, stabilisers, extenders, resins, tar compounds, pigments, reinforcing agents, thixotropes, flow-control agents and antioxidants.

The invention is illustrated in more detail in the following examples. Parts and percentages are by weight, unless expressly stated otherwise.

EXAMPLE 1

A jacketed stainless steel reactor equipped with a stirrer, heating and cooling means, a condenser and a thermometer was charged with 15 parts of hexamethoxymethylmelamine (HMMM) (commercial product Cymel ™ 303 from American Cyanamid), 15 parts of ethylene glycol monoethyl ether acetate and 45 parts of bisphenol A. At these concentrations, the reaction mixture contained 1.71 phenolic OH groups for every alkoxy group of the HMMM. The mixture was heated to 90° C. under a nitrogen blanket. As soon as the mixture had attained said temperature, 0.09 part of oxalic acid dihydrate was added as catalyst. The temperature of the mixture was slowly raised to 140° C. in the course of three hours and was held at 140° C. for a further hour. At that time the evolution of measurable amounts of methanol out of the reaction mixture ceased, indicating a substantially complete course of reaction. The reaction product (curing agent A) remained soluble in the ethylene glcyol monoethyl ether acetate. The percentage of conversion of the methoxy groups of the HMMM was calculated from the liberated amount of methanol as greater than 90%.

The reaction mixture was diluted with 28.7 parts of methyl isobutyl ketone to obtain a solids content of 55.3% by weight. After this dilution the resulting solution of curing agent was cooled down to room temperature. The kinematic viscosity of the resulting solution was determined at 25° C. in a suitable "Canon-Fenske" viscometer tube as 0.00219 square meters per second ($m^2/s$). Relative to the solids content the phenolic hydroxyl content was 7.73% by weight or 0.45 phenolic hydroxyl equivalents per 100 g of solids.

A curable epoxy resin solution suitable for use as a varnish composition in the production of electric laminates was prepared by mixing 133 parts of the solution of the polyfunctional phenolic reaction product obtained, as a curing agent, with 132 parts of an epoxy resin solution. The epoxy resin solution contained 28% of epoxy resin A, 47% of epoxy resin B and 25% of methyl isobutyl ketone. Also added was one part of a 5% strength solution of 2-methylimidazole in methanol and 48.9 parts of methyl isobutyl ketone. The epoxy resin A used for preparing the varnish composition was an epoxidised phenol-formaldehyde novolak resin having an epoxy equivalent weight (EEW) between 160 and 190 and a functionality of 5.6. Epoxy resin B was the diglycidyl ether of tetrabromobisphenol A having an EEW between 430 and 470. The epoxy resin varnish contained 55.2% of solids. The cured epoxy resin had a glass transition temperature of 170° to 175° C., as measured by thermal differential analysis.

COMPARATIVE EXAMPLE A

The method described in U.S. Pat. No. 4,393,181 was used for preparing the reaction product of HMMM and bisphenol A. First, a blend was prepared from 15 parts of HMMM and 45 parts of bisphenol A (no solvent and no catalyst). This blend contained 1.71 phenolic OH groups for every methoxy group, so that the ratio of phenolic OH groups to alkoxy groups was the same as in Example 1. The blend was then heated to 165° C. in the course of two hours during which, based on the evolved methanol, the HMMM was converted to 72%. The reaction product was a gelled mass which it was afterwards impossible to dissolve in organic solvents.

EXAMPLE 2

A stainless steel reactor as in Example 1 was charged with 25 parts of HMMM, 75 parts of bisphenol A and 25 parts of ethylene glycol monomethyl ether acetate. This reaction mixture contained 1.71 phenolic OH groups for every alkoxy group. The mixture was heated to 80° C., and 0.15 part of oxalic acid dihydrate was then added. The resulting mixture was then raised to 110° to 115° C. At that temperature the methanol began to distil off. The reaction mixture was then slowly raised to a temperature of 145° C. in the course of two hours. The reaction mixture was held at that temperature for a further hour. Afterwards the reaction was substantially complete, as indicated by the fact that the evolution of methanol had ceased. The reaction product (curing agent B) remained soluble in the ethylene glycol monomethyl ether acetate. The solution obtained had 65.5 parts of acetone added to it. The solution was then cooled at room temperature. The solids content was 50%. The phenolic hydroxyl group content was measured as 8.1% based on the solids content, or in other words 0.48 phenolic hydroxyl equivalents were present per 100 g of solids.

The resulting solution of the polyfunctional phenolic reaction product was used to prepare a varnish composition by mixing 21.9 parts of the diglycidyl ether of bisphenol A having an EEW between 177 and 188 and a viscosity at 25° C. between 7 and 10 pascalseconds (Pa.s) (epoxy resin C), 36.7 parts of epoxy resin B, 82.8 parts of a 50% strength solids solution of the polyfunctional phenolic reaction product, 0.094 part of 2-methylimidazole and 14.7 parts of toluene. The solids content of the resulting solution was 63%. This composition had a Brookfield viscosity measured on a RVT Brookfield viscometer using spindle 3 at 100 rpm at 25° C. of 0.15 Pa.s. The glass transition temperature of the cured epoxy resin was 150° to 155° C.

EXAMPLE 3

An epoxy resin varnish was prepared by mixing 21.8 parts of epoxy resin A, 36.7 parts of epoxy resin B, 41.5 parts of curing agent B (i.e. 83 parts of a 50% strength solution of curing agent B), 0.032 part of 2-methylimidazole and 21.3 parts of toluene. The solids content of the resulting composition was 61.4%. This varnish composition had a Brookfield viscosity of 0.19 Pa.s. The plate gel time of the paint composition was 189 seconds at 170° C. The plate gel time is measured on a hot plate set to an accurate temperature (170° C.). Using a wooden spatula a thin layer of the varnish composition is stirred until the mass forms a rubberlike gel.

The glass transition temperature of the cured epoxy resin was measured as 170° to 175° C.

COMPARATIVE EXAMPLE B

A varnish composition was prepared in conventional manner by mixing the following components: 156 parts of an 80% strength acetone solution of a diglycidyl ether of bisphenol A having an EEW between 182 and 192 increased with tetrabromobisphenol A to an EEW of 400 to 475 (epoxy resin D), 3 parts of dicyanodiamide and 0.42 part of benzyldimethylamine. The glass transition temperature of this cured epoxy resin was 118° C.

EXAMPLES 4 to 7

The general procedure of Example 2 was used to prepare a number of curing agents (curing agents C, D, E, F). The specific conditions and concentrations of diluent, phenol and alkoylated amine-aldehyde condensate are given by Table I.

TABLE I

| Type of curing agent | C[5] | D | E | F |
|---|---|---|---|---|
| Starting material, Parts | | | | |
| HMMM[1] | 25 | 27 | 30 | 35 |
| Bisphenol A | 75 | 73 | 60 | 65 |
| p-Tertiary-butylphenol | — | — | 10 | — |
| Phenolic OH/alkoxy OH | 1.71 | 1.54 | 1.28 | 1.06 |
| Solvent, Parts | | | | |
| Ethylene glycol mono-ethyl ether acetate | 25 | 25 | 25 | 33.6 |
| Reaction conditions[2] | | | | |
| Time, hours | 4.5 | 5.0 | 5.5 | 2 |
| Temperature °C. at end of reaction | 150 | 145 | 150 | 120 |
| Yield, %[3] | 92 | 92 | 80 | 63 |
| Phenolic OH, %[4] | 8.19 | 7.91 | 6.92 | 6.28 |

[1]HMMM = Hexamethoxymethylmelamine
[2]The reaction time includes the entire period for heating the reaction mixture plus the subsequent period for liberating the methanol. The temperature at the end of the reaction is the highest temperature to which the mixture is heated.
[3]The yield is to be understood as meaning the percentage of alkoxy groups of the HMMM which has been reacted, as determined by the amount of methanol distillate.
[4]Phenolic OH is the phenolic hydroxyl group content, expressed in % by weight of solids in the end product.
[5]In the reaction using the method of U.S. Pat. No. 4,393,181 a blend of 25 parts of HMMM and 75 parts of bisphenol A was reacted to give an irreversible gel which was not soluble in organic liquids. For that reason the product could not be used for preparing an epoxy resin composition. Using the procedure of U.S. Pat. No. 4,393,181 it is possible to obtain a non-gelled product only if the reaction mixture contains more than 2.2 phenolic OH groups for every alkoxy group.

An epoxy resin composition was then prepared from every one of these curing agent solutions, epoxy resins and 2-methylimidazole in the concentrations indicated in Table II. In the preparation of the epoxy resin composition acetone was used as an additional solvent. The acetone was used in a sufficient amount to obtain a 60% strength solution. The plate gel time and the glass transition temperature were determined for every one of the resulting compositions. The corresponding values are likewise indicated in Table II.

COMPARATIVE EXAMPLE C

A hexamethylolmelamine/bisphenol A reaction product was prepared by the method of U.S. Pat. No. 4,393,181. For this purpose a mixture was prepared from 16 parts of HMMM and 84 parts of bisphenol A without using a solvent or a catalyst. The mixture contained three phenolic OH groups for every methoxy group. The mixture was slowly heated to 165° C. in the course of two hours and was held at that temperature for a further two hours until the evolution of methanol had substantially ceased. The product, which was obtained in a yield of 94%, was a slightly coloured, friable solid once it had cooled down to room temperature. The product contained 9.84% of phenolic OH groups based on the total weight of curing agent. An epoxy resin composition including this curing agent (curing agent G) was then prepared using the epoxy resins indicated in Table II and 2-methylimidazole. The additional solvent used was acetone in a sufficient amount to give a 60% strength solution.

COMPARATIVE EXAMPLE D

A reaction product having a lower ratio of phenolic hydroxy groups to alkoxy groups (phenolic OH methoxy groups=2.28) was prepared using the method of U.S. Pat. No. 4,393,181. For this purpose 20 parts of HMMM and 80 parts of bisphenol A were mixed. This mixture was heated to 160° C. in the course of 3 hours and was maintained at that temperature for 3 hours. At that time the reaction had gone to 94% completion and the product was an irreversible gel. As it was impossible to dissolve the product in the customary organic solvents, it was unsuitable for the preparation of any epoxy resin varnish.

TABLE II

| Example No. | 4 | 5 | 6 | 7 | Comparative Example C* |
|---|---|---|---|---|---|
| Epoxy resin composition (1) formulation, parts | | | | | |
| Curing agent C | 39.5 | — | — | — | — |
| Curing agent D | — | 40.2 | — | — | — |
| Curing agent E | — | — | 43.0 | — | — |
| Curing agent F | — | — | — | 44.5 | — |
| Curing agent G | — | — | — | — | 36.5 |
| Epoxy resin B | 37.5 | 37.5 | 37.5 | 37.5 | 37.5 |
| Epoxy resin C | 23 | 22.3 | 19.5 | 18 | 26 |
| 2-Methylimidazole | 0.1 | 0.1 | 0.1 | 0.1 | 0.10 |
| Plate gel time at 175° C. seconds (2) | 128 | 103 | 121 | 149 | 210 |
| Glass transition temperature °C. (3) | 153 | 157 | 149 | 153 | 135 |

*no example of the invention
(1) The resin formulations were prepared in such a way that the ratio of epoxy resin to curing agent gave equivalent amounts of phenolic OH groups and epoxy groups. The parts of each component are relative to solids.
(2) The plate gel time is a measure of the reactivity of the epoxy resin. It was measured using the methods of Example 3.
(3) The glass transition temperature of the cured film of the epoxy resin was determined by thermal differential analysis.

As is revealed by Table II, the curing agents of the invention are more reactive than curing agents having a higher ratio of phenolic hydroxyl groups to alkoxy groups, as they are disclosed in the patent literature. Moreover, the cured epoxy resins which were prepared using a polyfunctional phenolic reaction product of the invention have a surprisingly higher glass transition temperature than cured epoxy resins cured using a curing agent having a higher ratio of phenolic OH groups to alkoxy groups.

EXAMPLE 5

A curing agent was prepared from a methylated urea-formaldehyde resin (commercial product Cymel® UFR 65 from American Cyanamide) and bisphenol A by blending 104 parts of the methylated urea-formaldehyde resin, 296 parts of bisphenol A and 100 parts of ethylene glycol monomethyl ether acetate. The reaction mixture was raised to 70° C., and 0.6 part of oxalic acid dihydrate was then added. The reaction temperature was slowly raised to 150° C. in the course of two hours, and that temperature was maintained for a further hour until the evolution of methanol had ceased. The concentration product was then diluted with 190 parts of methyl ethyl ketone and cooled down to room temperature. The resulting phenolic curing agent solution contained 59.6% of solids, had a viscosity at 25° C. of 2.65 Pa.s, and contained 8.5% of phenolic OH groups, based on the total solids content.

An epoxy resin varnish formulation was prepared using this curing agent. For this purpose, 32.5 g of the curing agent solution were mixed with 18.7 g of epoxy resin B, 11.8 g of epoxy resin C, 0.05 g of 2-methylimidazole and 3.2 g of methyl ethyl ketone. The clear solution obtained once the resins had dissolved had a plate gel time at 175° C. of 124 seconds. After curing, the film removed from the hot plate had a glass transition temperature of 147° C. as determined by thermal differential analysis.

We claim:

1. Polyfunctional phenolic reaction product of an alkylated amine-aldehyde condensation product with a polyhydric phenol or a mixture of a polyhydric phenol and a monohydric phenol, characterized in that the phenol compound(s) has been used in such an amount as to produce a ratio of phenolic OH groups to alkoxy groups of 1:1 to less than 2:1 and in that the reaction product is soluble in organic solvents.

2. reaction product according to claim 1, characterised in that the polyhydric phenol contains 2 to 6 hydroxyl groups and 6 to 30 carbon atoms.

3. Reaction product according to claim 1 or 2, characterised in that the phenol compound is a dihydric phenol having the following structural formula:

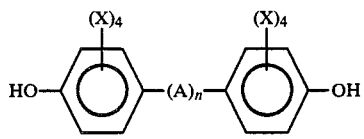

where A is oxygen, sulphur, —S—S—, —CO—, —SO$_2$—, a divalent hydrocarbon radical of 1 to 10 carbon atoms, an oxygen-, sulphur- or nitrogen-containing divalent hydrocarbon radical or a covalent bond; each X is independently hydrogen, halogen or a hydrocarbon group of 1 to 10 carbon atoms, preferably 1 to 4 carbon atoms, and n has a value of 0 or 1 or a mixture thereof.

4. Organic reaction product according to claims 1 or 2, characterized in that the alkylated amine-aldehyde condensation product is a hexaalkyl ether of hexamethylolmelamine of the general formula

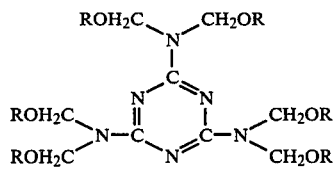

in which each R is independently an alkyl radical of 1 to 4 carbon atoms.

5. Reaction product according to claim 3, characterised in that A is a divalent hydrocarbon radical of 1 to 8 carbon atoms and each X is hydrogen.

6. Reaction product according to claim 5, characterized in that the alkylated amine-aldehyde condensation product is hexamethoxymethylmelamine and the dihydric phenol is bisphenol A.

7. Process for preparing a polyfunctional phenolic reaction product by reacting a alkylated amine-aldehyde condensation product with a polyhydric phenol or a mixture of a polyhydric phenol and a monohydric phenol, characterized in that the reaction is carried out in the presence of an acid catalyst and of an organic liquid diluent and the phenol compound(s) is used in a sufficient amount that at least one to less than two reactive phenolic hydroxyl groups is present for each alkoxy groups of the amine-aldehyde condensation product.

8. Process according to claim 7, characterized in that the amine-aldehyde condensation product is a hexaalkyl ether of hexamethylolmelamine and the phenol and the hexamethylolmelamine are used in amounts such that the ratio of phenolic OH groups to alkoxy groups is less the 2:1.

9. Process according to either of claims 7 or 8, characterised in that the ratio of phenolic OH groups to alkoxy groups is within the range from 1.2:1 to 1.95:1.

10. Process according to claims 7 or 8, characterized in that the acid catalyst is a monocarboxylic or polycarboxylic acid or an arylsulphonic acid.

11. Process according to claims 7 or 8, characterized in that the diluent is an ester, ketone, lower glycol ether or an aromatic hydrocarbon or a mixture thereof.

12. Process according to claim 11, characterised in that the diluent is ehtylene glycol monoethyl ether acetate or methyl isobutyl ketone.

13. Use of the polyfunctional phenolic reaction products according to claim 1 or 2, as curing agents for expoy resins.

14. Organic reaction product according to claim 3, characterized in that the alkylated amine-aldehyde condensation product is a hexaalkyl ether of hexamethylolmelamine of the general formula

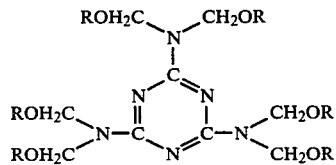

in which each R is independently an alkyl radical of 1 to 4 carbon atoms.

15. Process according to claim 9 characterized in that the acid catalyst is a monocarboxylic or polycarboxylic acid or an arylsulphonic acid.

16. Process according to claim 9 characterized in that the diluent is an ester, ketone, lower glycol ether or an aromatic hydrocarbon or a mixture thereof.

17. Process according to claim 10, characterized in that the diluent is an ester, ketone, lower glycol ether or an aromatic hydrocarbon or a mixture thereof.

* * * * *